March 15, 1949.  H. KLEMPERER  2,464,238

CONDENSER CHARGING SYSTEM

Filed Aug. 6, 1945

Inventor
Hans Klemperer
by Elmer J. Gorn
Attorney

Patented Mar. 15, 1949

2,464,238

UNITED STATES PATENT OFFICE 2,464,238

CONDENSER CHARGING SYSTEM

Hans Klemperer, Belmont, Mass., assignor to Raytheon Manufacturing Company, Newton, Mass., a corporation of Delaware Application August 6, 1945, Serial No. 609,058

10 Claims. (Cl. 320—1)

This invention relates to the charging of energy storage devices and more particularly to the charging of electrical condensers.

In the charging of energy storage devices such, for example, as electrical condensers of relatively large capacity, as, for example, where the stored energy is to be used for resistance welding of relatively heavy materials, the initial current drawn from the supply line is very high. This places a high instantaneous demand upon the source of supply and thus becomes a source of disturbance to other apparatus supplied from the same source. Furthermore, this high instantaneous demand requires that the elements of the charging system, such as the transformer, rectifying tubes and the like, have a sufficiently high power rating to carry the high current during the initial portion of the charging period although the average current over the entire charging period may be relatively low.

It is among the objects of the present invention to provide a system in which the flow of current to the energy storage device is more evenly distributed over the charging period, without substantially increasing the total time required to charge this storage device.

The foregoing and other objects and features of the invention will be made fully apparent to those skilled in the art from a consideration of the following detailed description taken in conjunction with the accompanying drawing in which.

Figure 1:
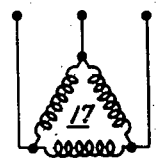
Fig. 1 is a diagram of a system embodying my invention.
Figure 1:
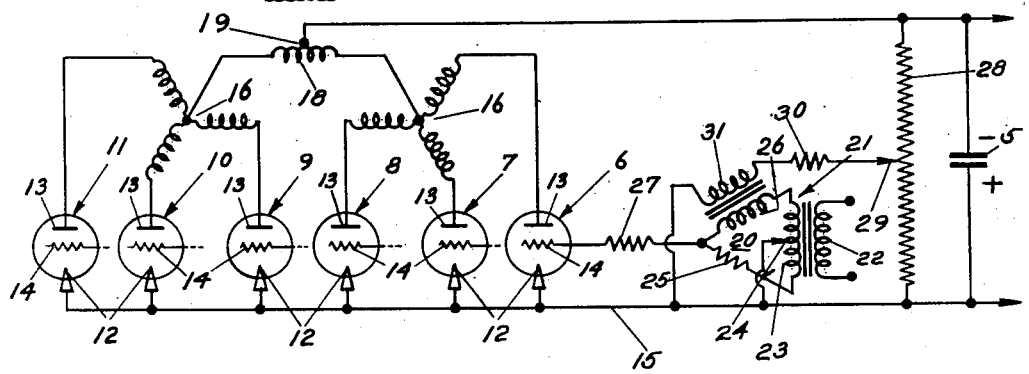

Referring to the drawing and first to Fig. 1 thereof, the system there shown comprises a condenser 5 which is to be charged from a commercial supply line, such as the three-phase supply line. The charging circuit for the rectifier includes a plurality of controlled rectifiers 6—11. These controlled rectifiers may be of the gas or vapor filled type, each having means to determine the initiation of the discharge during the period when the anode thereof is positive. As shown, each of the rectifiers 6—11 contains a cathode 12 of the permanently energized type, such as a thermionic filament, an anode 13, and a control grid 14. The cathodes 12 are connected by a common conductor 15 leading to the positive side of the condenser 5. The anodes 13 are fed from a source of multiple-phase alternating current by being connected to the outer ends of the phase windings of two Y-connected secondary windings 16 of a transformer having a delta-connected primary winding 17. The primary winding 17 is adapted to be energized from a three-phase alternating current line. The neutral points of the two secondary windings 16 are connected through an inter-phase reactor 18 having a center tap 19 connected to the negative side of the condenser 5.

In order to supply the control grids 14 of the tubes 6—11 with a control voltage for purposes of the present invention, each of the grids is connected to a phase shifting circuit 20. Since the phase shifting circuit for each of the tubes 6—11 is the same, but one of these is shown, and it will be understood that similar circuits are provided for each of the other tubes. In the instances shown, the phase shifting circuit 20 comprises a transformer 21 having a primary winding 22 connected to a source of single-phase current. The secondary winding 23 of the transformer 21 is provided with a center tap 24 connected to the line 15 common to the cathodes 12. One of the end terminals of the primary winding 23 is connected to a resistor 25. The other terminal of the primary winding 23 is connected to an inductor 26. The resistor 25 and the inductor 26 have a common terminal connected through a resistor 27 to the grid 14. A circuit of the type shown shifts the phase between the grid voltage and the applied voltage through an angle depending upon the relative values of the resistor 25 and the inductor 26, but does not alter the magnitude of these voltages.

In order to vary the value of the inductor 26 in a manner dependent upon the charge on the condenser 5 and thus shift the phase of the voltage applied to the grid 14, I provide a potentiometer 28 connected across the condenser 5. The potentiometer 28 has an adjustable tap 29 connected through a resistor 30 to one end of a winding 31 inductively arranged with respect to the winding 26. The other end of the winding 31 is connected to the common conductor 15 of the cathodes 12.

In the operation of the form of the invention just described, when there is no charge upon the condenser 5, the voltage drop between the cathode 12 and the grid 14 lags the voltage between the cathode and the anode 13 by such a large angle that, during the major portion of the positive half-wave of current on the anode 13, the grid 14 is negative relative to the cathode 12, and the tube does not fire until the latter portion of this positive half-wave. As the charge on the condenser 5 increases, the flow of current through the coil 31 increases gradually reducing the lag between the cathode-grid voltage and the cathode-plate voltage until the tube 6 is no longer blocked during the initial portion of a positive wave. Thus, the amount of current supplied to the condenser 5 during the latter portion of the charging period, that is to say, at the time when the charge thereon is already high and tends to oppose the voltage of the charging source, is brought more closely into correspondence with the rate of supply of charging current during the initial charging period when there is no opposing charge upon the condenser 5.

Figure 2:
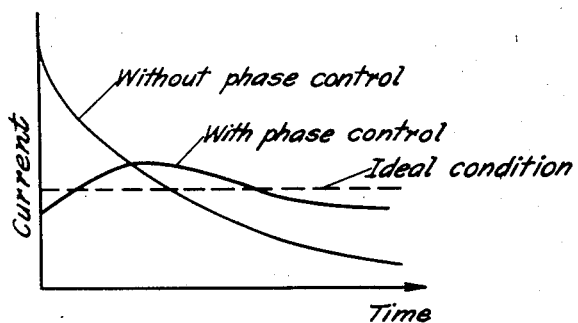
Fig. 2 shows a set of curves illustrating, in a general qualitative manner, certain operating characteristics of the invention.

The invention may be more fully understood by reference to the curves shown in Fig. 2, from which it will be seen that, where no phase control is provided for the grid-cathode voltage, the charging current has a high initial value from which it declines substantially exponentially. The ideal condition, indicated by the broken line curve of Fig. 2, would provide a constant charging current for the condenser 5 throughout the charging period. The system of the present invention provides a charging current which varies somewhat from the ideal condition as shown by the heavy solid line of Fig. 2. Thus, the charging current may vary from a value somewhat above to a value somewhat below the ideal condition, but at no time does the current flow rise to the high peak value which it would have at the initiation of the charging period where no such control is utilized.

It will be understood that when the charge on the condenser 5 attains a predetermined value, a blocking potential may be applied to the grids 14 in a known manner to prevent the charge on the condenser from exceeding a predetermined value. A suitable system for such purpose is shown in my prior Patent 2,250,102, patented July 22, 1941.

Figure 3:
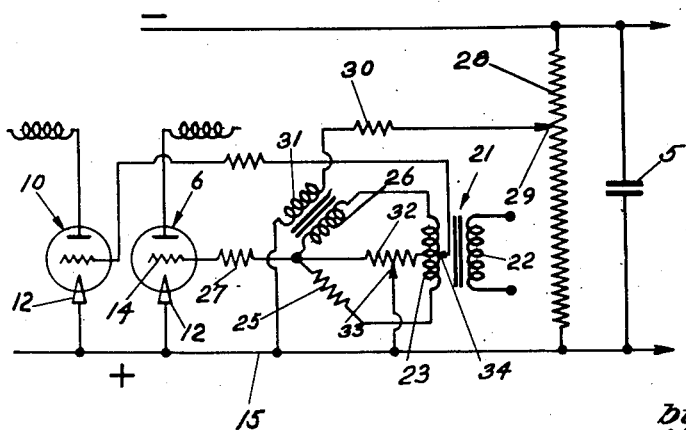
Fig. 3 is a fragmentary diagram of a modification of the arrangement shown in Fig. 1.

In the form of the invention shown in Fig. 1, it is assumed that one phase-shifting circuit is used for each of the rectifier tubes 6—11. The number of phase-shifting circuits may be reduced in the manner shown in Fig. 3. In this form of the invention one phase-shifting circuit may be utilized to energize two of the cathode-grid circuits, thus reducing the total number of phase-shifting circuits required. The circuit shown in this diagram is the same as that shown in Fig. 1 except that a resistor 32 is connected between the center tap 24 of the secondary winding 23 and the common terminal of the resistor 25 and inductor 26. The connection to the common cathode line 15 is made through a tap 33 on the resistor 32. As before, the common terminal of the reactor 25 and the inductor 26 is connected through a resistor 27 to one of the grids 14, for example, the grid of the tube 6. The center point of the secondary winding 23 may now be connected to whichever of the tubes 7—11 is 180° out of phase with the tube 6. It will be understood that, in the construction shown in Fig. 1, any one of the tubes 6—11 is 180° out of phase with one of the other tubes. For example, the tube 6 is 180° out of phase with the tube 10. The tube 7 is 180° out of phase with the tube 11, and the tube 8 is 180° out of phase with the tube 9. Thus, by connecting the grid 14 of whichever tube is 180° out of phase with the tube 6, in this instance the tube 10, to the center point 34 of the primary winding 23, the voltages applied to the cathode-grid circuit of the tube 10 will be 180° out of phase with the cathode-grid circuit of the tube 6. Thus both tubes will be controlled from a single phase-shifting circuit in the same manner that one tube was controlled in the form shown in Fig. 1.

While there have been herein described certain preferred embodiments of the invention, other embodiments within the scope of the appended claims will be apparent to those skilled in the art from a consideration of the form shown and the teachings hereof. Accordingly, a broad interpretation of the appended claims, commensurate with the scope of the invention within the art, is desired.

What is claimed is:

1. In combination, an energy storage device, rectifying means adapted to be energized from a source of alternating current for supplying charging current to said energy storage device, said rectifying means including a space discharge tube and control means to initiate conduction through said tube, means to energize said control means to fire said tube during the latter portion of a positive half wave of current applied to said tube from said source when the energy in said storage device is low, and means to shift the timing of said energizing means to fire said tube earlier in the cycle of the positive half wave as the energy stored in said device increases.

2. In combination, a condenser, rectifying means adapted to be energized from a source of alternating current for supplying charging current to said condenser, said rectifying means including a space discharge tube and control means to initiate conduction through said tube, means to energize said control means to fire said tube during the latter portion of a positive half wave of current applied to said tube from said source when the charge on said condenser is low, and means to shift the timing of said energizing means to fire said tube earlier in the cycle of the positive half wave as the charge on said condenser increases.

3. In combination, a condenser, rectifying means adapted to be energized from a source of alternating current for supplying charging current to said condenser, said rectifying means including a space discharge tube through which the discharge is controlled by a control electrode, means effective when the charge on said condenser is low to apply a blocking potential to said control electrode during the initial portion of a positive half wave of current applied to said tube from said source and to remove said blocking potential during the latter portion of said half wave, and means for unblocking said tube earlier in the cycle of the positive half wave as the charge on said condenser increases.

4. In combination, a condenser, rectifying means adapted to be energized from a source of alternating current for supplying charging current to said condenser, said rectifying means including a space discharge tube and control means to initiate conduction through said tube, means to apply an alternating control voltage out of phase with said source to said control means to fire said tube during the latter portion of said half wave when the charge on said condenser is low, and means for shifting the phase of said control voltage to fire said tube earlier in the cycle of the positive half wave as the charge on said condenser increases.

5. In combination, a condenser, rectifying means adapted to be energized from a source of alternating current for supplying charging current to said condenser, said rectifying means including a space discharge tube through which the discharge is controlled by a control electrode, means to apply an alternating control voltage out of phase with said source to said control electrode to fire said tube during the latter portion of said half wave when the charge on said condenser is low, and means for shifting the phase of said control voltage to fire said tube earlier in the cycle of the positive half wave as the charge on said condenser increases.

6. In combination, a condenser, rectifying means adapted to be energized from a source of alternating current for supplying charging current to said condenser, said rectifying means including a space discharge tube through which the discharge is controlled by a control electrode, a phase shifting circuit for applying an alternating control voltage out of phase with said source to said control electrode to fire said tube during the latter portion of said half wave when the charge on said condenser is low, and means for shifting the phase of said control voltage to fire said tube earlier in the cycle of the positive half wave as the charge on said condenser increases.

7. In combination, an energy storage device, a source of alternating current, a charging circuit connecting said storage device to said source, a control device in said charging circuit for controlling the flow of charging current to said storage device, and a phase-shifting device responsive to the voltage across said storage device for applying a phase-shifted voltage to said control device, the degree of phase shift varying inversely as the charge on said storage device.

8. In combination, a condenser, a source of alternating current, a charging circuit connecting said condenser to said source, a control device in said charging circuit for controlling the flow of charging current to said condenser, and a phase-shifting circuit responsive to the voltage across said condenser for applying a phase-shifted voltage to said control device, the degree of phase shift varying inversely as the charge on said condenser.

9. In combination, an energy storage device, said device originally being uncharged, a source of current, a charging circuit connecting said storage device to said source, a control device in said charging circuit for controlling the flow of charging current to said storage device, and energizing means for said control device responsive to the voltage across said storage device for applying a current-limiting control voltage to said control device to limit the flow of charging current to said storage device to a predetermined value which is greater than zero during the initial portion of the charging period.

10. In combination, a condenser, said condenser originally being uncharged, a source of current, a charging circuit connecting said condenser to said source, a control device in said charging circuit for controlling the flow of charging current to said condenser, and energizing means for said control device responsive to the voltage across said condenser for applying a current-limiting control voltage to said control device to limit the flow of charging current to said condenser to a predetermined value which is greater than zero during the initial portion of the charging period.

HANS KLEMPERER.

REFERENCES CITED

The following references are of record in the file of this patent:

UNITED STATES PATENTS

| Number | Name | Date |
| --- | --- | --- |
| 2,250,102 | Klemperer | July 22, 1941 |